United States Patent [19]

Ramlow et al.

[11] 4,014,846

[45] * Mar. 29, 1977

[54] LOW-VISCOUS, STABLE POLYMER DISPERSIONS AND POLYURETHANES PREPARED THEREFROM

[75] Inventors: Gerhard G. Ramlow, East Windsor, N.J.; Louis C. Pizzini, Trenton, Mich.; John T. Patton, Jr., Wyandotte, Mich.; John R. Murphy, Trenton, Mich.

[73] Assignee: BASF Wyandotte Corporation, Wyandotte, Mich.

[ * ] Notice: The portion of the term of this patent subsequent to Jan. 6, 1993, has been disclaimed.

[22] Filed: Apr. 29, 1974

[21] Appl. No.: 465,072

[52] U.S. Cl. .................... 260/33.2 R; 260/2.5 BE; 260/30.6 R; 260/30.8 R; 260/31.6; 260/31.8 K; 260/32.6 R; 526/271; 526/1; 526/5; 526/212; 526/320

[51] Int. Cl.$^2$ ................ C08G 18/14; C08G 18/62

[58] Field of Search ...... 260/80.75, 78.5 B, 86.1 N, 260/33.2 R, 30.6 R, 30.8 R, 31.6, 31.8 K, 32.6 R; 526/212, 320, 5, 1

[56] References Cited

UNITED STATES PATENTS

| | | | |
|---|---|---|---|
| 2,686,172 | 8/1954 | Wolf | 260/80.75 |
| 2,831,837 | 4/1958 | Evans | 260/78.5 B |
| 2,853,463 | 9/1958 | Gaylord | 260/80.75 |
| 3,161,623 | 12/1964 | Kühne | 260/80.75 |
| 3,285,887 | 11/1966 | de Vries | 260/80.75 |
| 3,304,273 | 2/1967 | Stamberger | 260/2.5 AM |
| 3,317,483 | 5/1967 | Verdol | 260/78.5 B |
| 3,383,351 | 5/1968 | Stamberger | 260/33.2 R |
| 3,475,366 | 10/1969 | Borovicka | 260/80.75 |
| 3,583,955 | 6/1971 | Holicky | 260/80.75 |
| 3,607,817 | 9/1971 | Trapasso | 260/80.75 |
| 3,652,639 | 3/1972 | Pizzini | 260/2.5 AQ |
| 3,719,647 | 3/1973 | Hardy | 260/86.1 N |
| 3,823,201 | 7/1974 | Pizzini | 260/33.2 R |
| 3,931,092 | 1/1976 | Ramlow | 526/212 |
| 3,966,521 | 6/1976 | Patton | 260/33.2 R |
| R28,715 | 2/1976 | Stamberger | 260/32.6 R |

Primary Examiner—C. Warren Ivy
Attorney, Agent, or Firm—Joseph D. Michaels; Bernhard R. Swick; Robert E. Dunn

[57] ABSTRACT

Low-viscous, stable polymer dispersions are prepared by blending a hydroxy-containing finely divided solid polymer with a polyol having an equivalent weight between 500 and 10,000. The resulting dispersions are particularly useful in the preparation of polyurethanes having enhanced physical properties particularly load bearing or hardness, tensile strength and tear resistance.

28 Claims, No Drawings

LOW-VISCOUS, STABLE POLYMER DISPERSIONS AND POLYURETHANES PREPARED THEREFROM

BACKGROUND OF THE INVENTION

1. Field of the Invention

The present invention relates to polymer dispersions having a Brookfield viscosity of less than 10,000 cps. at 25° C. More particularly, the invention relates to polymer dispersions particularly useful in the preparation of polyurethane foams which dispersions are prepared by blending a hydroxy-containing finely divided solid polymer with a polyol. The hydroxy-containing solid polymer is prepared by polymerizing in the presence of a free radical catalyst and an organic solvent a major amount of an ethylenically unsaturated monomer or mixture of monomers and a minor amount of a hydroxy-terminated organic compound having from one to eight hydroxyl groups, an equivalent weight of from 500 to 10,000 and containing a polymerizable carbon-to-carbon double bond.

2. Prior Art

The preparation of graft polymer dispersions from vinyl monomers and unsaturation-containing polyether polyols and the use thereof in the preparation of polyurethane compositions is well known in the art, as evidenced by U.S. Pat. No. 3,652,639 and Great Britain Pat. No. 1,126,025. These patents disclose various methods of preparing the dispersions. Illustrated therein is the fact that as the amount of vinyl monomer exceeds twenty percent by weight of the dispersion, the viscosity of the dispersion greatly increases, thus restricting the handling and use of the dispersions. Since it is primarily the polymeric species derived from the polymerization of the vinyl monomer(s) and the unsaturation-containing polyether polyol which provide the improved physical properties to the polyurethane compositions, it is of course desirable to increase the vinyl monomer content of the graft polymer dispersions. Prior to the subject invention, such efforts have been largely unsuccessful because of the viscosity problems mentioned above.

SUMMARY OF THE INVENTION

The present invention relates to low-viscous, stable polymer dispersions prepared by blending a hydroxy-containing finely divided solid polymer with a polyol. The dispersions generally comprise from 5 to 55 weight percent of the hydroxy-containing solid polymer and from 95 to 45 weight percent of the polyol. The resulting polymer dispersions offer advantages over those dispersions prepared in accordance with the prior art in that (1) the major amount of polyol does not have to be exposed to a polymerization reaction, thereby avoiding an oxidative environment; (2) the separately prepared hydroxy-containing finely divided solid polymer can be added to the polyol in any desired concentration; (3) the viscosities of the polymeric dispersions are lower than the in situ prepared dispersions at the same polymer concentrations; and (4) polyurethanes prepared from the subject dispersions surprisingly exhibit increased tensile strength and tear resistance vis-a-vis polyurethanes prepared from the in situ prepared dispersions.

DESCRIPTION OF THE PREFERRED EMBODIMENTS

In accordance with the subject invention low-viscous polymer dispersions are prepared by blending from 5 to 55 weight percent of a hydroxy-containing finely divided solid polymer with from 95 to 45 weight percent of a polyol. The dispersions may be prepared by dispersing the dry solid in the polyol by means of any suitable conventional mixing devices such as mills, impeller-type mixers, ribbon blenders, muller mixers, static and dynamic mixers, and conical drive blenders. The dispersions may also be prepared by adding the solid in the form of a finely divided dispersion in an organic solvent to the polyol and stripping off the solvent medium.

As mentioned above, there are two essential components which comprise the polymer dispersions of the subject invention, namely, a liquid polyol and a hydroxy-containing solid polymer. Representative polyols which may be employed in the present invention are well known in the art. They are often prepared by the catalytic condensation of an alkylene oxide or mixture of alkylene oxides either simultaneously or sequentially with an organic compound having at least two active hydrogen atoms such as evidenced by U.S. Pat. Nos. 1,922,451; 3,190,927, and 3,346,557.

Representative polyols include polyhydroxy-containing polyesters, polyalkylene polyether polyols, polyhydroxy-terminated polyurethane polymers, polyhydroxy-terminated polycaprolactone polyesters, polyhydroxy-containing phosphorus compounds, and alkylene oxide adducts of polyhydric polythioethers, polyacetals, aliphatic polyols and thiols, ammonia, and amines including aromatic, aliphatic, and heterocyclic amines, as well as mixtures thereof. Alkylene oxide adducts of compounds which contain two or more different groups within the above-defined classes may also be used such as amino alcohols which contain an amino group and a hydroxyl group. Also alkylene oxide adducts of compounds which contain one —SH group and one —OH group as well as those which contain an amino group and a —SH group may be used. Generally, the equivalent weight of the polyols will vary from 500 to 10,000, preferably from 1,000 to 3,000.

Any suitable hydroxy-containing polyester may be used such as are obtained from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, αhydromuconic acid, βhydromuconic acid, α-butyl-α-ethylglutaric acid, α-β-diethylsuccinic acid, isophthalic acid, terephthalic acid, hemimellitic acid, and 1,4cyclohexane-dicarboxylic acid. Any suitable polyhydric alcohol includinb both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, α-methyl glucoside, pentaerythritol, and sorbitol. Also included with the term "polyhydric alcohol" are compounds derived from phenol such as 2,2-bis(4-hydroxyphenyl)propane, commonly known as Bisphenol A.

Any suitable polyalkylene polyether polyol may be used such as the polymerization product of an alkylene oxide or of an alkylene oxide with a polyhydric alcohol having from two to eight hydroxyl groups. Any suitable polyhydric alcohol may be used such as those disclosed above for use in the penetration of the hydroxy-containing polyesters. Any suitable alkylene oxide may be used such as ethylene oxide, propylene oxide, butylene oxide, amylene oxide, and heteric or block copolymers of these oxides. The polyalkylene polyether polyols may be prepared from other starting materials such as tetrahydrofuran and alkylene oxide-tetrahydrofuran copolymer; epihalohydrins such as epichlorohydrin; as well as aralkylene oxides such as styrene oxide. The polyalkylene polyether polyols may have either primary or secondary hydroxyl groups and, preferably, are polyethers prepared from alkylene oxides having from two to six carbon atoms such as polyethylene ether glycols, polypropylene ether glycols, and polybutylene ether glycols. The polyalkylene polyether polyols may be prepared by any known process such as, for example, the process disclosed by Wurtz in 1859 and *Encyclopedia of Chemical Technology*, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2-(4,4'-hydroxyphenyl)propane and blends thereof having equivalent weights of from 250 to 5000.

Suitable polyhydric polythioethers which may be condensed with alkylene oxides include the condensation product of thiodiglycol or the reaction product of a dihydric alcohol such as is disclosed above for the preparation of the hydroxy-containing polyesters with any other suitable thioether glycol.

The hydroxy-containing polyester may also be a polyester amide such as is obtained by including some amine or amino alcohol in the reactants for the preparation of the polyesters. Thus, polyester amides may be obtained by condensing an anino alcohol such as ethanolamine with the polycarboxylic acids set forth above or they may be made using the same components that make up the hydroxy-containing polyester with only a portion of the components being a diamine such as ethylenediamine.

Polyhydroxy-containing phosphorus compounds which may be used include those compounds disclosed in U.S. Pat. No. 3,639,542. Preferred polyhydroxy-containing phosphorus compounds are prepared from alkylene oxides and acids of phosphorus having a $P_2O_5$ equivalency of from about 72% to about 95%.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkane thiols containing at least two —SH groups such as 1,2-ethane dithiol, 1,2-propane dithiol, 1,3-propane dithiol, and 1,6-hexane dithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-amino alinine, 1,5-diamino naphthalene, methylene dianiline, the condensation products of aniline and formaldehyde, and 2,4-diamino toluene; aliphatic amines such as methylamine, triisopropanolamine, ethylenediamine, 1,3-propylenediamine, 1,4-butylenediamine, and 1,3-butylenediamine.

In addition to the above polyols, other compounds which may be employed include graft polyols. These polyols are prepared by the in situ polymerization product of a vinyl monomer in a reactive polyol medium and in the presence of a free radical initiator. The reaction is generally carried out at a temperature ranging from about 40° C. to 150° C.

The reactive polyol medium generally has a molecular weight of at least about 500 and a hydroxyl number ranging from about 30 to about 600. The graft polyol has a molecular weight of at least about 1500 and a viscosity of less than 40,000 cps. at 10% polymer concentration.

A more comprehensive discussion of the graft polyols and their method of preparation can be found in U.S. Pat. Nos. 3,383,351; 3,304,273; 3,652,639, and in U.S. Pat. application Ser. No. 311,809 filed Dec. 4, 1972, now U.S. Pat. No. 3,823,201, the disclosures of which are hereby incorporated by reference.

Also, polyols containing ester groups can be employed in the subject invention. These polyols are prepared by the reaction of an alkylene oxide with an organic dicarboxylic acid anhydride and a compound containing a reactive hydrogen atom. A more comprehensive discussion of these polyols and their method of preparation can be found in U.S. Pat. Nos. 3,585,185; 3,639,541 and 3,639,542.

The second component of the polymer dispersions of the subject invention is a hydroxy-containing finely divided solid polymer. This component is prepared by polymerizing a major amount of an ethylenically unsaturated monomer(s) and a minor amount of certain hydroxy-terminated organic compounds in the presence of a free radical catalyst and an organic solvent. The polymerization may be carried out at a temperature between 25° 1 C. and 180° C., preferably between 60° C. and 90° C. The particular temperature employed will depend primarily on the alcohol used and whether atmospheric or non-atmospheric conditions are selected.

As mentioned, one of the ingredients employed in the preparation of the finely divided solid polymer is an ethylenically unsaturated monomer or a mixture of said monomers. Representative monomers include butadiene, isoprene, 1,4-pentadiene, 1,6-hexadiene, 1,7-octadiene, styrene, α-methylstyrene, methylstyrene, 2,4-dimethylstyrene, ethylstyrene, isopropylstyrene, butylstyrene, phenylstyrene, cyclohexylstyrene, benzylstyrene, and the like; substituted styrenes such as chlorostyrene, 2,5 dichlorostyrene, bromostyrene, fluorostyrene, trifluoromethylstyrene, iodostyrene, cyanostyrene, nitrostyrene, N,N-dimethylaminostyrene, acetoxylstyrene, methyl 4-vinylbenzoate, phenoxystyrene, p-vinyl diphenyl sulfide, p-vinylphenyl phenyl oxide, and the like; the acrylic and substituted acrylic monomers such as acrylonitrile, acrylic acid, methacrylic acid, methylacrylate, 2-hydroxyethyl acrylate, 2-hydroxyethyl methacrylate, methyl methacrylate, cyclohexyl methacrylate, benzyl methacrylate, isopropyl methacrylate, octyl methacrylate, methacrylonitrile, methyl α-chloroacrylate, ethyl α-ethoxyacrylate, methyl α-acetaminoacrylate, butyl acrylate, ethyl acrylate, 2-ethylhexylacrylate, phenyl acrylate, phenyl methacrylate, α-chloroacrylonitrile, N,N-dimethylacrylamide, N,N-dibenzyl-acrylamide, N-butylacrylamide, methacrylyl formamide, and the like; the vinyl esters, vinyl ethers, vinyl ketones, etc., such as vinyl acetate, vinyl chloroacetate, vinyl alcohol, vinyl butyrate, isoproperyl acetate, vinyl formate, vinyl methoxy acetate, vinyl benzoate, vinyl iodide, vinyl toluene, vinyl naphthalene, vinyl bromide, vinyl chloride, vinyl fluoride, vinylidene bromide, vinylidene chloride, 1-chloro-1-fluoro-ethylene, vinylidene fluoride, vinyl methyl ether, vinyl ethyl ether, vinyl propyl ethers, vinyl butyl ethers, vinyl 2-ethylhexyl ether, vinyl phenyl ether, vinyl 2-methoxyethyl ether, methoxybutadiene, vinyl 2-butoxyethyl ether, 3,4-dihydro-1,2-pyran, 2-butoxy-2'-vinyloxy diethyl ether, vinyl 2-ethylmercaptoethyl ether, vinyl methyl ketone, vinyl ethyl ketone, vinyl phosphonates such as bis($\beta$-chloroethyl)vinyl phosphonate, vinyl phenyl ketone, vinyl ethyl sulfide, vinyl ethyl sulfonate, N-methyl-N-vinyl acetamide, N-vinyl-pyrrolidone, vinyl imidazole, divinyl sulfide, divinyl sulfoxide, divinyl sulfone, sodium vinyl sulfonate, methyl vinyl sulfonate, N-vinyl pyrrole, and the like; dimethyl fumarate dimethyl maleate, maleic acid, crotonic acid, fumaric acid, itaconic acid, monomethyl itaconate, t-butylaminoethyl methacrylate, dimethylaminoethyl methacrylate, glycidyl acrylate, allyl alcohol, glycol monoesters of itaconic acid, dichlorobutadiene, vinyl pyridine, and the like. Any of the known polymerizable monomers can be used and the compounds listed above are illustrative and not restrictive of the monomers suitable for use in this invention. In the preparation of the solid polymer, the amount of ethylenically unsaturated monomer employed is generally from about 55% to 95%, preferably from 60% to 80%, by weight based on the total weight of the monomer and hydroxy-terminated organic compound.

Illustrative catalysts which may be employed in the preparation of the solid polymers of use in the present invention are the well-known free radical type of vinyl polymerization catalysts, for example: the peroxides, persulfates, perborates, percarbonates, azo compounds, etc., including hydrogen peroxide, dibenzoyl peroxide, acetyl peroxide, benzoyl hydroperoxide, t-butyl hydroperoxide, di-t-butyl peroxide, lauroyl peroxide, butyryl peroxide, diisopropylbenzene hydroperoxide, cumene hydroperoxide, paramenthane hydroperoxide, diacetyl peroxide, di-$\alpha$-cumyl peroxide, dipropyl peroxide, diisopropyl peroxide, isopropyl-t-butyl peroxide, butyl-t-butyl peroxide, dilauroyl peroxide, difuroyl peroxide, ditriphenylmethyl peroxide, bis(p-methoxybenzoyl)peroxide, p-monomethoxybenzoyl peroxide, rubrene peroxide, ascaridol, t-butyl peroxybenzoate, diethyl peroxyterephthalate, propyl hydroperoxide, isopropyl hydroperoxide, n-butyl hydroperoxide, t-butyl hydroperoxide, cyclohexyl hydroperoxide, trans-Decalin hydroperoxide, $\alpha$-methylbenzyl hydroperoxide, $\alpha$-methyl-$\alpha$-ethylbenzyl hydroperoxide, Tetralin hydroperoxide, triphenylmethyl hydroperoxide, diphenylmethyl hydroperoxide, $\alpha$-$\alpha$-azo-2-methyl butronitrile, $\alpha,\alpha'$-2-methyl heptontrile, 1,1'-azo-1-cyclohexane carbonitrile, dimethyl-$\alpha,\alpha'$-azoisobutyrate, 4,4'-azo-4-cyanopentanoic acid, azobis(isobutyronitrile), persuccinic acid, diisopropyl peroxy dicarbonate, and the like; a mixture of catalysts may also be used. Azobis(isobutyronitrile) is the preferred catalyst.

Another ingredient employed in the preparation of the finely divided solid polymer is a hydroxy-terminated organic compound containing a polymerizable carbon-to-carbon double bond. The hydroxy-terminated organic compounds have an average molecular weight of from 1,000 to 20,000 and have from one to eight hydroxyl groups. The compounds are well known in the art and are generally prepared by the reaction of an organic compound having from one to eight hydroxyl groups with an organic compound having both ethylenic unsaturation and a hydroxyl, carboxyl, or epoxy group. They may also be prepared by employing an organic compound having both ethylenic unsaturation and a hydroxyl, carboxyl, or epoxy group as a reactant in the preparation of the organic compound having from one to eight hydroxyl groups. Furthermore, the hydroxy-terminated organic compounds may be prepared by the reaction of a suitable organic compound having from two to eight hydroxyl groups with a monoester, a halogen-containing compound or an isocyanate-terminated compound, each of which contains a polymerizable carbon-to-carbon double bond, or with a compound, such as acetylene, which upon reaction yields a polymerizable carbon-to-carbon double bond.

Specifically, the hydroxy-terminated organic compounds may be prepared (1) by the reaction of an organic compound having from one to eight hydroxyl groups with a compound such as maleic anhydride; (2) by employing a compound such as allyl glycidylether in the preparation of the organic compound having from one to eight hydroxyl groups; (3) by the transesterification reaction of an organic compound having from two to eight hydroxyl groups with ethyl acrylate, methyl methacrylate, or a similar compound, or by the esterification of the said organic compound with acrylic acid, methacrylic acid, etc.; (4) by the reaction of the sodium or potassium metal salt of an organic compound having from two to eight hydroxyl groups with allyl chloride or vinyl chloride; or (5) by the reaction of the subject organic compounds with acetylene. Additionally, the product of the reaction of toluene diisocyanate with a compound having an active hydrogen and a polymerizable carbon-to-carbon double bond such as 2-hydroxypropyl methacrylate may be reacted with an organic compound having from two to eight hydroxyl groups to yield a hydroxy-terminated organic compound containing a polymerizable carbon-to-carbon double bond. Alternatively, a similar compound may be prepared by treating the prepolymer resulting from the reaction of toluene diisocyanate with an organic compound having from two to eight hydroxyl groups with compounds such as 2-hydroxyethyl acrylate, 4-hydroxybutyl acrylate and the like.

Representative of the organic compounds having both ethylenic unsaturation and a hydroxyl, carboxyl or epoxy group which may be used include unsaturated mono- and polycarboxylic acids and anhydrides such as maleic acid and anhydride, fumaric acid, crotonic acid and anhydride, propenyl succinic anhydride, and halogenated maleic acids and anhydrides; unsaturated polyhydric alcohols such as 2-butene-1,4-diol, glycerol allylether, trimethylolpropane allylether, pentaerythritol allylether, pentaerythritol vinylether, pentaerythritol diallylether, and 1-butene-3,4-diol; unsaturated epoxides such as 1-vinylcyclohexane-3,4-epoxide, butadiene monoxide, vinyl glycidylether(1-vinyloxy-2,3-epoxy propane), glycidyl methacrylate and 3-allyloxy-propylene oxide (allyl glycidylether). If a polycarboxylic acid or anhydride is employed to incorporate unsaturation into the compounds, it is then preferred to react the resulting compounds with an alkylene oxide, preferably ethylene or propylene oxide, to replace the carboxyl groups with hydroxyl groups prior to employment in the present invention. The amount of alkylene oxide employed is such to reduce the acid number of the hydroxy-terminated organic compound to about one or less. Representative ester-containing compounds containing a polymerizable carbon-to-carbon double bond include methyl acrylate, ethyl acrylate, propyl acrylate, n-butyl acrylate, and the corresponding methacrylates. Representative halogen-containing compounds containing a polymerizable carbon-to-carbon double bond include vinyl chloride, allyl chloride, acrylyl chloride, methacrylyl chloride, vinyl bromide, allyl bromide, acrylyl bromide and methacrylyl bromide.

Representative organic compounds which may be employed in the preparation of the hydroxy-terminated organic compounds employed in the present invention are well known in the art. They are often prepared by the catalytic condensation of an alkylene oxide or mixture of alkylene oxides either simultaneously or sequentially with an organic compound having from one to eight active hydrogen atoms. Any of the polyols mentioned above may be used as well as alkylene oxide adducts of alcohols, phenols, amines, mercaptans and other compounds having one active hydrogen atom.

To prepare the hydroxy-terminated organic compounds, from about 1.0 mole to about 6.0 moles, preferably from 1.0 mole to 2.0 moles, of the unsaturation-containing organic compound per mole of organic compound having from one to eight reactive hydrogen atoms is employed. The preparation of the compounds employed in the present invention follows conventional prior art procedures such as disclosed in U.S. Pat. Nos. 3,275,606 and 3,280,077. Generally, this requires a reaction at a temperature between 0° C. and 150° C. Both acidic catalysts, such as Lewis acid catalysts and basic catalysts such as alkali metal hydroxides, may be used. In addition, a non-catalyzed reaction may be used employing temperatures between 50° C. and 200° C.

As mentioned above, the preparation of the solid polymers occurs in the presence of an organic solvent. To be useful in the present invention, the solvent should have a boiling point of between 25° C. and 250° C. at ambient pressure. Representative organic solvents which may be employed in the process of the subject invention include aliphatic, alicyclic and aromatic hydrocarbons, alcohols, esters, ketones, amides, amines, ethers, nitriles, sulfoxides and the corresponding nitro- and halo-substituted derivatives thereof. Exemplary of these solvents include pentane, hexane, heptane, nonane, undecane, dodecane, petroleum, ether, methanol, ethanol, isopropanol, t-butanol, benzyl alcohol, acetone, propanone, butanone, methylethylketone, ethylbutylketone, acetophenone, benzene, naphthalene, toluene, 1,2,4-trimethylbenzene, ethylacetate, isopropylacetate, butylacetate, the acetate ester of the butyl ether of diethylene glycol, diethylene glycol, monomethyl ether, carbon tetrachloride, chloroform, chlorobenzene, trichloroethylene 1,1,1-trichloro-1,1,1-trifluoroethane, trifluorochloromethane, dimethylformamide, dimethylsulfoxide, tetrahydrofuran, bis(2-methoxyethylether)-benzonitrile, 2-nitropropane, nitrobenzene and acetonitrile. Mixtures of the above solvents may also be employed. As is apparent, the particular solvent employed is not critical to the process of the subject invention. The preferred group of solvents are the aliphatic alcohols having from one to four carbon atoms such as methanol, ethanol, propanol, isopropanol and t-butanol.

In addition to the ingredients mentioned above, a chain transferring agent may be employed in the preparation of the solid polymer of use in the invention. Generally from about 0.1% by weight to 2% by weight of chain transferring agent based on the weight of the vinyl monomer will be used in the invention. Alkyl mercaptans having from one to twenty carbon atoms in the alkyl chain may be employed in the present invention. Representative mercaptans include ethyl mercaptan, propyl mercaptan, butyl mercaptan, hexyl mercaptan, octyl mercaptan, decyl mercaptan, dodecyl mercaptan, tetradecyl mercaptan, cetyl mercaptan, and stearyl mercaptan.

The preparation of the polymeric solids of use in the subject invention may be carried out in several ways. Since the polymerization is generally carried out at temperatures below 100° C., a preferred embodiment of the invention is to charge all components to a reactor and apply heat thereto. Optionally, the reaction may be carried out by adding the monomer or a blend of the monomers and catalyst to the other reactants. Also, a portion of the catalyst, chain transferring agent and monomer may be dispersed in a portion of hydroxy-terminated unsaturation-containing organic compound and added to a reaction vessel containing the remaining portion of the reactants, catalyst, solvent and chain transferring agent. In addition, the catalyst, chain transferring agent, and monomer may be combined optionally with a portion of the hydroxy-terminated unsaturation-containing organic compound in a mixing device and thereafter added to a reaction vessel containing the remaining reactants. The preparation of the polymeric solids is more fully described in our U.S. Pat. application Ser. No. 465,234 filed on even date herewith, now U.S. Pat. No. 3,931,092.

The preferred dispersions of the invention are obtained by blending a polyol with a hydroxy-containing finely divided solid polymer which is prepared from a compound having a polymeric chain compatible with said polyol. Thus, for example, high oxypropylene-containing polyols should be blended with polymers prepared from organic compounds having high oxypropylene contents.

In another embodiment of the present invention, the foregoing polymer dispersions are employed in the preparation of polyurethane compositions, particularly polyurethane foams. The resulting polyurethane products exhibit marked improvements in load-bearing properties, tensile strength, and tear resistance without substantial impairment of the other physical properties of the products. The polyurethane products are generally prepared by the reaction of the polymer dispersions with an organic polyisocyanate, optionally in the presence of additional polyhydroxy-containing components, chain extending agents, catalysts, surface-active agents, stabilizers, blowing agents, fillers and pigments. Suitable processes for the preparation of cellular polyurethane plastics are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the polymer dispersions of the present invention to prepare a prepolymer having free isocyanate groups which is then reacted in a second step with water to prepare a foam. Alternately, the components may be reacted in a single working step commonly known as the "one-shot" technique of preparing polyurethanes. Furthermore, in place of all or part of the water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

Organic polyisocyanates which may be employed include aromatic, aliphatic, and cycloaliphatic polyisocyanates and combinations thereof. Representative of these types are the diisocyanates such as m-phenylene diisocyanate, tolylene-2,4-diisocyanate, tolylene-2,6-diisocyanate, mixtures of 2,4- and 2,6-hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4'-diisocyanate, 4,4'-biphenylene diisocyanate, 3,3'-dimethoxy-4,4'-biphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene 2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Crude polyisocyanate may also be used in the compositions of the present invention, such as crude toluene diisocyanate obtained by the phosgenation of a mixture of toluene diamines or crude diphenylmethane isocyanate obtained by the phosgenation of crude diphenylmethyl diamine. The preferred unreacted or crude isocyanates are disclosed in U.S. Pat. No. 3,215,652.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water and primary and secondary diamines which react more readily with the prepolymer than does water such as phenylenediamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, 2-methylpiperazine, morpholine, and dodecahydro-1,4,7-9b-tetrazaphenalene.

Any suitable catalyst may be used including tertiary amines, such as for example, triethylenediamine, N-methyl morpholine, N-ethyl morpholine, diethyl ethanolamine, N-coco morpholine, 1-methyl-4-dimethylamino ethyl piperazine, 3-methoxy-N-dimethyl propylamine, N-dimethyl-N'-methyl isopropyl propylenediamine, N,N-diethyl-3-diethylamino propylamine, dimethylbenzylamine, and the like. Other suitable catalysts are, for example, tin compounds such as stannous chloride, tin salts of carboxylic acids, such as dibutyltin di-2-ethyl hexoate, stannous octoate, as well as other organometallic compounds such as are disclosed in U.S. Pat. No. 2,846,408.

A wetting agent or surface-active agent is generally necessary for production of high grade polyurethane foam according to the present invention since in the absence of same the foams collapse or contain very large uneven cells. Numerous wetting agents have been found satisfactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane were determined by the following ASTM tests:

| Tensile Strength | D-412 |
| Elongation | D-412 |
| Split Tear | D-470 |
| Compression Set | D-395 |
| Compression Load | D-1564 |

In the Examples which follow, the hydroxy-terminated organic compounds containing a polymerizable carbon-to-carbon double bond (hereinafter referred to as HTOC) are prepared in the following manner.

PREPARATION OF HTOC-I

A stainless steel autoclave equipped with a thermometer, stirrer, nitrogen source, inlet means and heat exchange means was charged with 98 parts of maleic anhydride and 4800 parts of a 4800 molecular weight polyol prepared by the reaction of ethylene oxide with the reaction product of propylene oxide with glycerol and propylene glycol (mole ratio of glycol to propylene glycol of 3.2:1), said polyol having an ethylene oxide content of thirteen percent by weight of the polyol and a hydroxyl number of 35. The charge was purged with nitrogen and heated to 175° C. Then, 264 parts of ethylene oxide was gradually added to the reaction mixture over two hours. Upon completion of the oxide addition, the reaction mixture was maintained at 175° C. for seven hours, at which time the reaction mixture was cooled to 25° C. and discharged from the autoclave. The reaction product was stripped at 100° C. for one hour under less than ten millimeters of mercury to remove unreacted ethylene oxide. The product, a clear golden yellow liquid, had a hydroxyl number of 34.3, an acid number of 0.3, a refractive index at 25° C. of 1.4547 and a Brookfield viscosity at 25° C. of 1420 cps.

PREPARATION OF HTOC-II

A reaction vessel equipped as described above was charged with 73.5 parts of maleic anhydride and 5050 parts of a 2240 equivalent weight polyol prepared by capping with ethylene oxide a propylene oxide adduct of trimethylolpropane, said polyol having an oxyethylene content of fifteen percent by weight of the polyol and a hydroxyl number of 25. Following the procedure described above, 198 parts of ethylene oxide was then added to the charge at 175° C. for a period of two hours. The reaction temperature was maintained at 175° C. for 11 hours, cooled to 25° C. and discharged from the vessel. The reaction product was stripped at 100° C. for one hour under less than ten millimeters of mercury. The product, a clear liquid, had a hydroxyl number of 24.5, an acid number of 0.1 and a Brookfield viscosity at 25° C. of 2800 cps.

PREPARATION OF HTOC-III

A reaction vessel equipped as described above was charged with 2637 parts of an 8350 molecular weight polyoxyethylene polyoxypropylene block copolymer prepared by the reaction of ethylene oxide with the propylene oxide adduct of propylene glycol (oxyethylene content of eighty percent by weight) and 29.4 parts of maleic anhydride. The charge was purged with nitrogen and heated to 175° C. and pressurized with nitrogen to 34 psig. With constant stirring, 79 parts of ethylene oxide was gradually added to the charge over a two-hour period. Upon completion of the oxide addition the reaction mixture was maintained at 175° C. for eleven hours. The reaction mixture was cooled to 30° C. and discharged from the reactor. The product, hereinafter referred to as HTOC-III, was a clear liquid having a hydroxyl number of 25 and an acid number of 0.01.

PREPARATION OF HTOC-IV

A stainless steel autoclave equipped with a thermometer, stirrer, nitrogen source, inlet means and heat exchange means was charged with 5009 parts (1.67 moles) of a 3000 molecular weight polyol prepared by the reaction of propylene oxide with glycerol in the presence of potassium hydroxide. The charge was purged with nitrogen and heated to 103° C. With constant stirring, 245 parts (2.5 moles) of maleic anhydride was then added to the charge maintaining the temperature of the charge at 103° C. for fifteen minutes. Then, 290 parts (5.0 moles) of propylene oxide was gradually added to the reaction mixture over 2.5 hours. Upon completion of the oxide addition, the reaction mixture was cooled to 30° C. and discharged from the autoclave. The reaction product was treated with an adsorbent, filtered to remove the catalyst and stripped at 100° C. for 1 hour under less than 10 millimeters of mercury to remove unreacted propylene oxide. The product, hereinafter referred to as HTOC-IV, a clear golden yellow liquid, had a hydroxyl number of 52.2, an acid number of 0.6, a refractive index at 25° C. of 1.4544 and a Brookfield viscosity at 25° C. of 1200 cps.

PREPARATION OF HTOC-V

A stainless steel autoclave equipped with a thermometer, stirrer, nitrogen source, inlet means and heat exchange means was charged with 137 parts of maleic anhydride and 4860 parts of a 3869 molecular weight polyol prepared by the reaction of ethylene oxide with the reaction product of propylene oxide with propylene glycol, said polyol having an ethylene oxide content of twenty percent by weight of the polyol and a hydroxyl number of 29. The charge was purged with nitrogen and heated to 175° C. Then, 198 parts of ethylene oxide was gradually added to the reaction mixture over two hours. Upon completion of the oxide addition, the reaction mixture was maintained at 175° C. for eleven hours, at which time the reaction mixture was cooled to 25° C. and discharged from the autoclave. The reaction product was stripped at 100° C. for one hour under less than 10 millimeters of mercury to remove unreacted ethylene oxide. The product, a clear golden yellow liquid, had a hydroxyl number of 25.3 and an acid number of 0.04.

PREPARATION OF HTOC-VI

An autoclave equipped as described above was charged with 196 parts of maleic anhydride and 5100 parts of the 2240 equivalent weight polyol described above in the preparation of HTOC-II. Following the procedure described above, 198 parts of ethylene oxide was then added to the charge at 175° C. for a period of two hours. The reaction temperature was maintained at 175° C. for 11 hours, cooled to 25° C. and discharged from the vessel. The reaction product was stripped at 100° C. for one hour under less than ten millimeters of mercury. The liquid product had a hydroxyl number of 22.5 and an acid number of 0.09.

PREPARATIONS OF SOLID POLYMERS

A series of hydroxy-containing finely-divided solid polymers was prepared by polymerizing a major amount of an ethylenically unsaturated monomer or mixture of monomers and a hydroxy-terminated organic compound containing a polymerizable carbon-to-carbon double bond (HTOC) in an organic solvent. In each case, a reaction vessel equipped with a stirrer, thermometer, reflux condenser, inlet and outlet means, nitrogen source and heat exchange means was charged with a solvent, catalyst, monomer(s) and HTOC. The charge was heated to 70° C.–80° C. and the reaction mixture was then maintained at 70° C.–80° C. for about 5 to 8 hours. Dispersions containing finely-divided particles generally varying in size between 0.1 micron to 5 microns were obtained. With the exception of the preparation of Polymer 11 wherein benzoyl peroxide was employed, the free radical catalyst employed was azobis(isobutyronitrile) in an amount varying from 0.2 to 1.0 percent by weight based on the weight of the ethylenically unsaturated monomer(s). Details of the preparations are presented in Table I, below.

In addition to the above abbreviations, the following abbreviations are used in Table I:

E — ethanol
IP — isopropanol
M — methanol
T — toluene
DMF — dimethylformamide
CT — carbon tetrachloride
THF — tetrahydrofuran
DEG — diethylene glycol monomethyl ether
EA — ethylacetate
MEK — methyl ethyl ketone
NP — 2-nitropropane
AC — acetonitrile
DMS — dimethyl sulfoxide
HP — heptane
PY — pyridine

Table I

| Polymer | HTOC, Parts | Organic Solvent, Parts | Vinyl Monomer, Parts | | | | |
|---|---|---|---|---|---|---|---|
| | | | St | AN | MMA | VCl$_2$ | EHA |
| 1 | I 25 | E 75 | 50 | 50 | — | — | — |

Table I-continued

| Polymer | HTOC, Parts | Organic Solvent, Parts | Vinyl Monomer, Parts | | | | |
|---|---|---|---|---|---|---|---|
| | | | St | AN | MMA | VCl | EHA |
| 2 | I 25 | E 75 | 65 | 35 | — | — | — |
| 3 | I 10 | E 90 | 65 | 35 | — | — | — |
| 4 | I 40 | E 60 | 65 | 35 | — | — | — |
| 5 | I 25 | E 75 | — | — | 25 | 75 | — |
| 6 | I 17 | IP 83 | 66 | — | — | — | — |
| 7 | I 20 | IP 80 | 43 | 23 | — | — | — |
| 8 | I 17 | IP 83 | 50 | — | — | — | 17 |
| 9 | II 20 | IP 80 | 80 | 20 | — | — | — |
| 10 | II 20 | M 80 | 80 | 20 | — | — | — |
| 11 | II 10 | IP 90 | 100 | — | — | — | — |
| 12 | II 10 | T 90 | 13 | 7 | — | — | — |
| 13 | II 10 | DMF 90 | 10 | 10 | — | — | — |
| 14 | II 10 | CT 90 | 10 | 10 | — | — | — |
| 15 | II 10 | THF 90 | 10 | 10 | — | — | — |
| 16 | II 10 | DEG 90 | 10 | 10 | — | — | — |
| 17 | III 10 | IP 90 | 100 | — | — | — | — |
| 18 | II 10 | EA 90 | 10 | 10 | — | — | — |
| 19 | II 10 | MEK 90 | 42 | 28 | — | — | — |
| 20 | II 10 | NP 90 | 10 | 10 | — | — | — |
| 21 | II 10 | AC 90 | 10 | 10 | — | — | — |
| 22 | II 10 | DMS 90 | 10 | 10 | — | — | — |
| 23 | IV 10 | HP 90 | 10 | 10 | — | — | — |
| 24 | II 20 | IP 80 | 60 | 40 | — | — | — |
| 25 | II 20 | IP 80 | 50 | 50 | — | — | — |
| 26 | II 33 | IP 67 | 50 | 50 | — | — | — |
| 27 | V 25 | IP 75 | 38 | 25 | — | — | — |
| 28 | II 10 | PY 90 | 10 | 10 | — | — | — |
| 29 | VI 14 | IP 86 | 43 | 14 | — | — | — |

EXAMPLES I-XXXIII

A series of low-viscous polymer dispersions was prepared by blending various amounts of the solid polymers described above dispersed in an organic solvent with a polyol. The blend was then stripped under reduced pressure, eventually less than ten millimeters of mercury, at a temperature between 50° C. and 120° C. for about one hour. In each case, a stable low-viscous polymer dispersion was obtained. Details of the preparations are presented in Table II, below. In the Table, the following new abbreviations are employed:

Polyol A - a 1,000 equivalent weight polyol prepared by the reaction of propylene oxide with glycerol, said polyol having a hydroxyl number of 56.

Polyol B - a 2,240 equivalent weight polyol prepared by capping with ethylene oxide a propylene oxide adduct of trimethylolpropane, said glycol having an oxyethylene content of fifteen percent by weight and a hydroxyl number of 25.

Polyol C - a 1,935 equivalent weight polyol prepared by capping with ethylene oxide a propylene oxide adduct of propylene glycol, said polyol having an oxyethylene content of approximately twenty percent by weight and a hydroxyl number of 29.

Polyol D - a 1,600 equivalent weight polyol prepared by capping with ethylene oxide a propylene oxide adduct of glycerol and propylene glycol, said polyol having an oxyethylene content of approximately thirteen percent by weight and a hydroxyl number of 35.

Polyol E - a 1,000 equivalent weight polypropylene glycol.

Table II

| Example | Polyol, Parts | Polymer,* Parts | Polymer Conc. in Dispersion, % | Viscosity of Dispersion, cps |
|---|---|---|---|---|
| I | A 160 | 1 100 | 28 | 1375 |
| II | A 500 | 2 250 | 24 | 925 |
| III | A 600 | 2 375 | 24 | 1020 |
| IV | A 600 | 3 378 | 22 | 1110 |
| V | A 600 | 4 342 | 24 | 1025 |
| VI | A 364 | 5 287 | 29 | 3385 |
| VII | A 750 | 6 513 | 25 | 9000 |
| VIII | A 600 | 7 330 | 25 | 1260 |
| IX | A 751 | 8 505 | 25 | N.D. |
| X | A 400 | 9 1000 | 60 | 6120 |
| XI | A 400 | 10 1000 | 60 | 7650 |
| XII | A 120 | 11 60 | 20 | 3300 |
| XIII | B 113 | 12 275 | 30 | 3175 |
| XIV | B 225 | 13 275 | 25 | 4025 |
| XV | B 225 | 14 275 | 25 | 2625 |
| XVI | B 225 | 15 275 | 25 | 2075 |
| XVII | B 225 | 16 275 | 25 | 2850 |
| XVIII | A 120 | 17 60 | 20 | 3300 |
| XIX | B 225 | 18 275 | 25 | 2400 |
| XX | B 450 | 19 350 | 25 | 4260 |
| XXI | B 225 | 20 275 | 25 | 2865 |
| XXII | B 225 | 21 275 | 25 | 2550 |
| XXIII | B 425 | 22 275 | 15 | 2870 |
| XXIV | A 425 | 23 275 | 15 | 2865 |
| XXV | C 700 | 24 500 | 30 | 2180 |
| XXVI | C 900 | 24 500 | 25 | 1850 |
| XXVII | C 1200 | 24 500 | 20 | 1550 |
| XXVIII | D 1200 | 24 500 | 20 | 1690 |
| XXIX | E 475 | 25 250 | 24 | 780 |
| XXX | E 450 | 26 275 | 28 | 895 |
| XXXI | C 264 | 27 325 | 40 | 3000 |
| XXXII | B 225 | 28 275 | 25 | 2550 |
| XXXIII | B 188 | 29 94 | 20 | 2740 |

*Dispersions prepared in Table I
N.D.=Not determined

EXAMPLE XXXIV

Into an evaporating dish was added 251 parts of the dispersed polymer identified as Polymer 10 in Table I. The contents of the dish was heated to 65° C. for two hours. Thereafter, 150 parts (99% of theory) of dry solid polymer was obtained. The polymer was then mixed with 100 parts of the polyol identified as polyol A, above, and mixed in a paint mill to give a thick, stable, white dispersion having a Brookfield viscosity of 8300 cps. at 25° C.

EXAMPLE XXXV

A series of polyurethane foams was prepared employing the polymer dispersions described in the previous examples as polyol component. The control foam was prepared employing a 3,000 molecular weight propylene oxide adduct of glycerol as the polyol component (identified as A in Table III). Details of the preparations as well as physical properties of the resulting foams are presented in Table III, below. The surprising increase in physical properties, particularly tensile strength, tear strength and load bearing, of the foams are illustrated by the data in the Table.

Table III

| Ingredients, Parts Polymer Dispersion of Example | A 300 | II 300 | III 300 | V 300 | VI 300 | A 120 XI 18C |
|---|---|---|---|---|---|---|
| Water | 9.0 | 9.0 | 9.0 | 9.0 | 9.0 | 9.0 |
| Bis(N,N-dimethylaminoethyl)-ether | 0.3 | 0.3 | 0.3 | 0.3 | 0.3 | 0.3 |
| Stannous Octoate | 0.7 | 0.7 | 0.7 | 0.7 | 0.7 | 0.7 |
| Silicone Surfactant | 3.0 | 3.0 | 3.0 | 3.0 | 3.0 | 3.0 |
| Toluene Diisocyanate (80/20-2,4-/2,6-isomers) | 119 | 113 | 113 | 113 | 113 | 112 |
| Physical Properties | | | | | | |

Table III-continued

| Ingredients, Parts Polymer Dispersion of Example | A 300 | II 300 | III 300 | V 300 | VI 300 | A 120 XI 18C |
|---|---|---|---|---|---|---|
| Density, pcf. | 1.9 | 1.9 | 1.8 | 1.8 | 1.8 | 1.8 |
| Tensile Strength, psi. | 13.9 | 19.8 | 27.4 | 24.4 | 23.2 | 24.8 |
| % Elongation | 200 | 137 | 170 | 160 | 213 | 107 |
| Tear, psi. | 2.6 | 3.7 | 3.4 | 3.2 | 3.8 | 2.9 |
| I.L.D. lb./in.$^2$ | | | | | | |
| Sample Thickness, in. | 1.0 | 1.0 | 1.0 | 1.0 | 1.0 | 1.0 |
| 25% | 1.2 | 2.1 | 2.3 | 2.1 | 1.8 | 2.9 |
| 65% | 2.4 | 4.6 | 4.8 | 4.7 | 3.9 | 6.2 |
| 25% return | 0.8 | 1.3 | 1.4 | 1.3 | 1.0 | 1.8 |
| Sag Factor | 2.1 | 2.1 | 2.1 | 2.2 | 2.1 | 2.2 |
| Guide Factor | 0.6 | 1.2 | 1.2 | 1.2 | 1.0 | 1.6 |
| C.L.D., psi. | | | | | | |
| 25% | 0.5 | 0.9 | 1.0 | 0.9 | 0.7 | 1.2 |
| 65% | 0.9 | 1.7 | 1.8 | 1.6 | 1.3 | 2.4 |
| Compression Sets, % | | | | | | |
| 50% | 3.9 | 7.2 | 5.8 | 5.2 | | 6.6 |
| 90% | 4.1 | 8.0 | 8.4 | 8.7 | | 49.9 |

The embodiments of the invention in which an exclusive property or privilege is claimed are defined as follows:

1. A low-viscous, stable polymer dispersion prepared by blending:
   a. from 45 to 95 weight percent of a liquid polyol having a hydroxyl equivalent weight of from 500 to 10,000 with
   b. from 55 to 5 weight percent of a hydroxycontaining finely-divided solid polymer obtained by polymerizing in the presence of a free radical catalyst and an organic solvent:
      1. from about 55% to 95% by weight of an ethylenically unsaturated monomer or mixture of monomers and
      2. from about 45% to 5% by weight of a hydroxyterminated organic compound having from one to eight hydroxyl groups, a hydroxyl equivalent weight of from 500 to 10,000 and containing a polymerizable carbon-to-carbon double bond, said weight percents being based on the total weight of (1) and (2).

2. The dispersion of claim 1 wherein the ethylenically unsaturated monomer is selected from the group consisting of styrene, acrylonitrile, vinylidene chloride, methylmethacrylate, acrylamide and mixtures thereof.

3. The dispersion of claim 1 wherein the ethylenically unsaturated monomer is styrene.

4. The dispersion of claim 1 wherein the hydroxy-terminated organic compound is prepared by the reaction of from one to two moles of an organic compound having both ethylenic unsaturation and a carboxylic acid or anhydride group with one mole of a hydroxycontaining polyalkylene polyether followed by reaction with an alkylene oxide to yield a compound having an acid number of less than one.

5. The dispersion of claim 4 wherein the hydroxycontaining polyalkylene ether is an alkylene oxide adduct of trimethylolpropane, glycerol, propylene glycol and mixtures thereof.

6. The dispersion of claim 1 wherein the ethylenically unsaturated monomer comprises from 60 to 80 weight percent based on the total weight of monomer and hydroxy-terminated organic compound.

7. The dispersion of claim 1 wherein the organic solvent is an alkanol.

8. The dispersion of claim 7 wherein the alkanol is isopropanol.

9. The dispersion of claim 1 wherein (a) is a polyalkylene polyether polyol.

10. The dispersion of claim 1 wherein the ethylenically unsaturated monomer is a mixture of styrene and acrylonitrile 11. The dispersion of claim 1 wherein the hydroxyterminated organic compound is prepared by the reaction of from one to two moles of an organic compound having both ethylenic unsaturation and a hydroxyl, carboxyl or epoxy group with one mole of a hydroxy-containing polyalkylene polyether followed by reaction with an alkylene oxide to yield a compound having an acid number of less than one.

12. A process for the preparation of a lowviscous, stable polymer dispersion which comprises:
   a. polymerizing in the presence of a free radical catalyst and an organic solvent:
      1. from about 55% to 95% by weight of an ethylenically unsaturated monomer or mixture of monomers and
      2. from about 45% to 5% by weight of a hydroxyterminated organic compound having from one to eight hydroxyl groups, a hydroxyl equivalent weight of from 500 to 10,000 and containing a polymerizable carbon-to-carbon double bond, said weight percents being based on the total weight of (1) and (2);
   b. adding to the finely divided dispersed solid of (a) a liquid polyol having a hydroxyl equivalent weight of from 500 to 10,000, and
   c. separating the organic solvent from the product resulting from step (b).

13. The process of claim 12 wherein the ethylenically unsaturated monomer is selected from the group consisting of styrene, acrylonitrile, vinylidene chloride, methylmethacrylate, acrylamide and mixtures thereof.

14. The process of claim 12 wherein the ethylenically unsaturated monomer is styrene.

15. The process of claim 12 wherein the hydroxyterminated organic compound is prepared by the reaction of from one to two moles of an organic compound having both ethylenic unsaturation and a carboxylic acid or anhydride group with one mole of a hydroxycontaining polyalkylene polyether followed by reaction with an alkylene oxide to yield a compound having an acid number of less than one.

16. The process of claim 15 wherein the hydroxycontaining polyalkylene ether is an alkylene oxide adduct of trimethylolpropane, glycerol, propylene glycol and mixtures thereof.

17. The process of claim 12 wherein the ethylenically unsaturated monomer comprises from 60 to 80 weight percent based on the total weight of monomer and hydroxy-terminated organic compound.

18. The process of claim 12 wherein the organic solvent is an alkanol.

19. The process of claim 18 wherein the alkanol is isopropanol.

20. The process of claim 12 wherein (a) is a polyalkylene polyether polyol.

21. The process of claim 12 wherein the ethylenically unsaturated monomer is a mixture of styrene and acrylonitrile.

22. The process of claim 12 wherein the hydroxyterminated organic compound is prepared by the reaction of from one to two moles of an organic compound having both ethylenic unsaturation and a hydroxyl, carboxyl or epoxy group with one mole of a hydroxy-containing polyalkylene polyether followed by reaction with an alkylene oxide to yield a compound having an acid number of less than one.

23. A process for the preparation of a lowviscous, stable polymer dispersion which comprises:
   a. polymerizing in the presence of a free radical catalyst and an organic solvent:
      1. from about 55% to 95% by weight of an ethylenically unsaturated monomer or mixture of monomers and
      2. from about 45% to 5% by weight of a hydroxy-terminated organic compound having from one to eight hydroxyl groups, a hydroxyl equivalent weight of from 500 to 10,000 and containing a polymerizable carbon-to-carbon double bond, said weight percents being based on the total weight of (1) and (2);
   b. separating the solvent from the product resulting from step (a) whereby a finely-divided white powder is obtained, and
   c. blending the finely-divided white powder with a liquid polyol having a hydroxyl equivalent weight of from 500 to 10,000.

24. A low-viscous stable polymer dispersion prepared by blending:
   a. from 45 to 95 weight percent of a liquid polyalkylene polyether polyol having a hydroxyl equivalent weight of from 500 to 10,000 with
   b. from 55 to 5 weight percent of a hydroxycontaining finely-divided solid polymer obtained by polymerizing in the presence of a free radical catalyst and an organic solvent:
      1. from about 55% to 95% by weight of a mixture of styrene and acrylonitrile and
      2. from about 45% to 5% by weight of a hydroxy-terminated organic compound having from one to eight hydroxyl groups, a hydroxyl equivalent weight of from 500 to 10,000 and containing a polymerizable carbon-tocarbon double bond, said hydroxyterminated organic compound prepared by the reaction of from one mole to six moles of an organic compound having both ethylenic unsaturation and a carboxylic acid or anhydride group with one mole of a polyalkylene polyether polyol followed by reaction with an alkylene oxide to yield a compound having an acid number of less than one, said weight percents being based on the total weight of (1) and (2).

25. The dispersion of claim 24 wherein the organic compound having both ethylenic unsaturation and a carboxylic acid or anhydride group is maleic anhydride.

26. A process for the preparation of a lowviscous stable polymer dispersion which comprises:
   a. polymerizing in the presence of a free radical catalyst and an organic solvent:
      1. from about 55% to 95% by weight of a mixture of styrene and acrylonitrile and
      2. from about 45% to 5% by weight of a hydroxy-terminated organic compound having from one to eight hydroxyl groups, a hydroxyl equivalent weight of from 500 to 10,000 and containing a polymerizable carbon-tocarbon double bond, said hydroxy-terminated organic compound prepared by the reaction of from one mole to six moles of an organic compound having both ethylenic unsaturation and a carboxylic acid or anhydride group with one. mole of a polyalkylene polyether polyol followed by reaction with an alkylene oxide to yield a compound having an acid number of less than one, said weight percents being based on the total weight of (1) and (2);
   b. adding to the finely-divided dispersed solid of (a) a liquid polyalkylene polyether polyol having a hydroxyl equivalent weight of from 500 to 10,000, and
   c. separating the organic solvent from the product resulting from step (b).

27. The process of claim 26 wherein the organic compound having both ethylenic unsaturation and a carboxylic acid or anhydride group is maleic anhydride.

28. A process for the preparation of a lowviscous stable polymer dispersion which comprises:
   a. polymerizing in the presence of a free radical catalyst and an organic solvent:
      1. from about 55% to 95% by weight of a mixture of stryene and acrylonitrile and
      2. from about 45% to 5% by weight of a hydroxy-terminated organic compound having from one to eight hydroxyl groups, a hydroxyl equivalent weight of from 500 to 10,000 and containing a polymerizable carbon-to-carbon double bond, said hydroxyterminated organic compound prepared by the reaction of from one mole to six moles of an organic compound having both ethylenic unsaturation and a carboxylic acid or anhydride group with one mole of a polyalkylene polyether polyol followed by reaction with an alkylene oxide to yield a compound having an acid number of less than one, said weight. percents being based on the total weight of (1) and (2);
   b. separating the solvent from the product resulting from step (a) whereby a finely-divided white powder is obtained; and
   c. blending the finely divided white powder with a liquid polyalkylene polyether polyol having a hydroxyl equivalent weight of from 500 to 10,000.

* * * * *